United States Patent Office 3,470,179
Patented Sept. 30, 1969

3,470,179
4-SUBSTITUTED-3,4-DIHYDROQUINAZOLINES
Hans Ott, Convent Station, N.J., assignor to Sandoz Inc., Hanover, N.J.
No Drawing. Filed June 14, 1966, Ser. No. 557,372
Int. Cl. C07d 51/48, 99/04; A61k 27/00
U.S. Cl. 260—251
18 Claims

ABSTRACT OF THE DISCLOSURE

The invention discloses novel compounds of the class of 4-substituted-3,4-dihydroquinazolines which are 4-cycloalkyl-3,4-dihydroquinazolines, 4-pyridyl-3,4-dihydroquinazolines, 4-furyl-3,4-dihydroquinazolines, 4-thienyl-3,4-dihydroquinazolines or 4-phenyl(lower)alkyl-3,4-dihydroquinazolines, all possessing pharmaceutical activity in animals and useful, for example, as Central Nervous System stimulants, as analgesic, anti-inflammatory and local anesthetic agents.

---

The present invention is directed to 4-substituted-3,4-dihydroquinazolines of the formula:

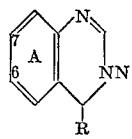

I wherein

R is either cycloalkyl having from 5 to 7 ring carbon atoms, e.g. cyclopentyl, cyclohexyl and cycloheptyl; pyridyl, e.g. 2-pyridyl, 3-pyridyl and 4-pyridyl; furyl, e.g. α-furyl and β-furyl; thienyl, e.g. α-thienyl and β-thienyl; or phenyl(lower)alkyl, e.g. benzyl and phenethyl; and Ring A is either unsubstituted or substituted in from one to two positions, preferably the 6- and/or the 7-position, with from one to two substituents, such as halogen, e.g. chlorine (—Cl) and bromine (—Br); lower alkyl, e.g. methyl, ethyl and propyl; lower alkoxy, e.g. methoxy and ethoxy; and methylenedioxy;

their pharmaceutically acceptable acid addition salts and therapeutic compositions in which such a dihydroquinazoline constitutes at least one of the active ingredients.

Compounds I are prepared from their corresponding quinazolines II by addition thereto of either a Grignard reagent III or an organic lithium compound IV according to the following reaction schemes:

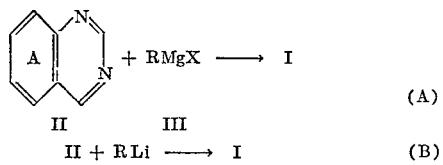

wherein

X is either iodine (—I), bromine (—Br) or chlorine (—Cl) and
R and ring A have their above-ascribed meanings.

The reaction takes place across the 3,4-CN double bond in known manner.

Quinazolines II are either available compounds or are readily prepared by established procedures known to those skilled in the art from available starting material. A convenient method for preparing Compounds II (see Example 10) is in accord with the following reaction scheme:

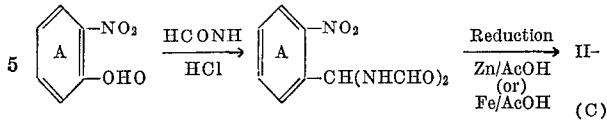

Likewise, Compounds III are prepared from known starting materials according to reaction scheme D and Compounds IV are similarly prepared in accord with reaction scheme E:

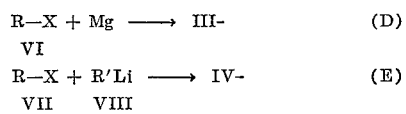

wherein

R' is n-butyl;
X' is either a chlorine atom or a bromine atom; and each of R and ring A has its above-ascribed meaning.

Compounds I and their pharmaceutically acceptable acid addition salts are CNS-active compounds and are useful as such. They are CNS stimulants and/or antidepressants. In addition the compounds have further advantageous pharmacological properties, e.g. analgesic, anti-inflammatory and local anesthetic properties.

Compounds I and their pharmaceutically acceptable acid addition salts are administered either orally or parenterally in standard dosage forms, e.g. tablets and capsules. Daily dosages vary from 30 to 250 milligrams, administered either as a single dose or in divided dosages of from 15 to 125 milligrams each and from 2 to 4 times per day.

Among the pharmaceutically acceptable acid addition salts are salts of organic acids, e.g. tartaric acid; inorganic acids, e.g. hydrochloric acid, hydrobromic acid and sulfuric acid; monobasic acids, e.g. an alkanesulfonic acid, such as methanesulfonic acid ($H_3C-SO_3H$); dibasic acids, e.g. succinic acid, tribasic acids, e.g. phosphoric acid and citric acid; saturated acids, e.g. acetic acid; ethylenically unsaturated acids, e.g. maleic acid and fumaric acid; and aromatic acids, e.g. salicyclic acid and arylsulfonic acids, such as benzenesulfonic acid. The only limitation on the acid selected is that the resulting acid addition salts be pharmaceutically acceptable; the acid does not nullify the therapeutic properties of Compounds I.

The said dosage may be suitable for oral use for example as tablets, aqueous or oily suspensions, dispersible powders or granules, emulsions, hard or soft capsules, syrups or elixirs.

Compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide an elegant and palatable preparation.

The said tablets contain the active ingredient in admixture with non-toxic pharmaceutical excipients known to be suitable in the manufacture of tablets. Suitable pharmaceutical excipients may be, for example, inert diluents, for example calcium carbonate, sodium carbonate, lactose, calcium phosphate or sodium phosphate, granulating and disintegrating agents, for example maize starch, or alginic acid, binding agents for example starch, gelatin or acacia and lubricating agents, for example magnesium stearate, stearic acid or talc. The tablets may be uncoated or they may be coated by known techniques to delay disintegration and absorption in the gastro-intestinal tract and thereby provide a sustained action over a longer period.

The said tablet compositions may be formulated so that for every 600 parts by weight of the composition there are present between 5 and 95 parts by weight of active ingredient (i.e. Compound I or pharmaceutically acceptable acid addition salt thereof) and preferably between 25 and 85 parts by weight of the active ingredient.

The said aqueous suspensions contain the active ingredient in admixture with excipients known to be suitable in the manufacture of aqueous suspensions. Suitable excipients may be, for example suspending agents, for example sodium carboxymethylcellulose, methylcellulose, hydroxypropylmethylcellulose, sodium alginate, polyvinylpyrrolidione, gum tragacanth and gum acacia. Dispersing or wetting agents may be a naturally-occurring phosphatide, for example lecithin, or condensation products of ethylene oxide with fatty acids, for example polyoxyethylene stearate, or condensation products of ethylene oxide with long chain aliphatic alcohols, for example heptadeca-ethyleneoxy-cetanol, or condensation products of ethylene oxide with partial esters derived from fatty acids and a hexitol, for example polyoxyethylene sorbitol mono-oleate, or condensation products of ethylene oxide with partial esters derived from fatty acids and hexitol anhydrides, for example polyoxyethylene sorbitan mono-oleate. The said aqueous suspensions may also contain one or more preservatives for example ethyl or n-propyl p-hydroxybenzoate, one or more coloring agents, one or more flavoring agents and one or more sweetening agents such as sucrose, saccharin or sodium cyclamate.

Oily suspensions may be formulated by suspending the active ingredient in a vegetable oil, for example arachis oil, olive oil, sesame oil or coconut oil, or in a mineral oil such as liquid paraffin, and the said oily suspensions may contain a hickening agent, for example beeswax, hard paraffin or cetyl alcohol. Sweetening agents, for example icing sugar, sodium saccharin or sodium cyclamate, and flavoring agents, for example caramel, may be added to provide a palatable oral preparation. These compositions may be preserved by the addition of an anti-oxidant such as propyl gallate or ascorbic acid.

Dispersible powders and granules suitable for the extemporaneous preparation of an aqueous suspension by the addition of water contain the active ingredient in admixture with a dispersing or wetting agent, suspending agent and one or more preservatives. Suitable dispersing or wetting agents and suspending agents are those mentioned above in the description of aqueous suspension formulations. Additional excipients for example sweetening, flavoring and coloring agents, may optionally also be present.

The pharmaceutical compositions of the invention may also be in the form of oil-in-water type emulsions. The oily phase may be a vegetable oil, for example, olive oil or arachis oils, or a mineral oil for example liquid paraffin or mixtures of these. Suitable emulsifying agents may be naturally-occurring gums, for example gum acacia or gum tragacanth, naturally-occurring phosphatides, or example soya bean lecithin, and esters or partial esters derived from fatty acids and hexitol anhydrides, for example sorbitan mono-oleate, and condensation products of the said partial esters with ethylene oxide, for example polyoxyethylene sorbitan mono-oleate. The emulsions may optionally contain sweetening and flavoring agents.

Formulations for oral use may be presented as hard gelatin capsules wherein the active ingredient is mixed with an inert solid diluent, for example calcium carbonate, calcium phosphate or kaolin, or as soft gelatine capsules wherein the active ingredient is mixed with an oily medium, for example arachis oil, liquid paraffin or olive oil.

Syrups and elixirs may be formulated with sweetening agents, for example glycerol, sorbitol or sucrose. Such formulations may also contain a demulcent, a preservative and flavoring and coloring agents.

The pharmaceutical compositions may be in the form of a sterile injectable preparation for example as a sterile injectable aqueous suspension. This suspension may be formulated according to the known art using those suitable dispersing or wetting agents and suspending agents which have been mentioned above.

The sterile injectable preparation may also be a sterile injectable solution or suspension in a non-toxic parenterally-acceptable diluent or solvent for example as a solution in 1:3-butane diol.

In the examples which follow, the parts and percentages are by weight unless otherwise specified and the temperatures are in degrees centigrade. The relationship between parts by weight and parts by volume is the same as that between the kilogram and the liter.

EXAMPLE 1

4-cyclohexyl-3,4-dihydroquinazoline

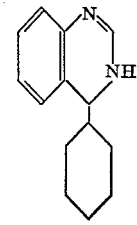

Cover 3 parts of magnesium filings with 50 parts by volume of dry diethylether and add thereto 5 parts by volume of an ethereal solution (13.9 parts of cyclohexylbromide in 100 parts by volume of diethylether). Reflux the thus-obtained mixture until the Grignard reaction starts. Add the remainder of the above-described ethereal solution of cyclohexylbromide dropwise so as to keep the reaction mixture boiling. After additional refluxing of this Grignard solution, add dropwise thereto a solution of 10 parts of quinazoline in 100 parts by volume of diethylether within 15 minutes and continue refluxing for 1 hour. Decompose the reaction mixture by adding thereto a total of 1000 parts by volume of water (dropwise at first). Separate the organic phase and extract the aqueous phase twice with diethylether. Dry the combined organic phases over sodium sulfate, and evaporate the solvent in vacuo. Crystallize the residue (title compound), melting point (M.P.) 118° to 120°, from ethylacetate-diethylether.

Replacing the quinazoline with an equivalent of either 7-chloroquinazoline, 6-ethoxyquinazoline, 6-bromoquinazoline, 6,7-diethoxyquinazoline, 6-methoxyquinazoline or 6-ethoxy-7-methoxyquinazoline results in the preparation, in similar manner, of 7-chloro-4-cyclohexyl-3,4-dihydroquinzaoline, 6 - ethoxy-4-cyclohexyl-3,4 - dihydroquinazoline, 6-bromo-4-cyclohexyl-3,4-dihydroquinazoline, 6,7-diethoxy-4-cyclohexyl-3,4-dihydroquinazoline, 6-methoxy-4-cyclohexyl - 3,4 - dihydroquinazoline and 6-ethoxy-7-methoxy-4-cyclohexyl-3,4-dihydroquinazoline.

EXAMPLE 2

4-α-pyridyl-3,4-dihydroquinazoline maleate

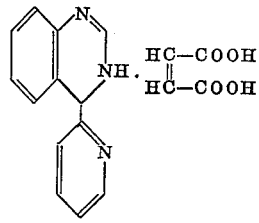

Add to 58 parts by volume of a 1.6 N solution of butyl lithium in hexane (at −40°) a solution of 14.2 parts of freshly distilled 2-bromopyridine in 100 parts by volume of diethylether within 5 minutes. To the thus-obtained α-pyridyl lithium solution add 10 parts of quinazoline in 100 parts by volume of diethylether within from 5 to 10 minutes. Continue stirring for 15 minutes at −20°. Pour the reaction mixture onto ice cold 2 N hydrochloric acid and separate the aqueous layer from the organic layer. Alkalize the aqueous phase with 30% (aq) sodium hydroxide solution and extract the thus-alkalized aqueous phase twice with methylene chloride. Dry the combined organic phases over sodium sulfate, filter and evaporate the methylene chloride in vacuo. Dissolve the thus-obtained oily residue in 100 parts by volume of ethanol and add thereto 10 parts of maleic acid dissolved in 80 parts of ethanol to precipitate the title compound, M.P. 173° to 175°.

Replacing the quinazoline with an equivalent of either 6-chloroquinazoline, 6,7-dichloroquinazoline, 6-bromoquinazoline, 7-bromoquinazoline or 6-methoxyquinazoline results in the preparation, in similar manner, of 6-chloro-4-α-pyridyl-3,4-dihydroquinazoline, 6,7 - dichloro-4-α-pyridyl-3,4-dihydroquinazoline, 6-bromo-4-α-pyridyl-3,4-dihydroquinazoline, 7-bromo-4-α-pyridyl-3,4-dihydroquinazoline and 6-methoxy - 4 - α - pyridyl - 3,4-dihydroquinazoline, respectively. Likewise, replacing the 2-bromopyridine with an equivalent of either 3-bromopyridine or 4-bromopyridine results in the preparation, in similar manner, of 4-β-pyridyl-3,4-dihydroquinazoline or 4-γ-pyridyl-3,4-dihydroquinazoline, respectively.

EXAMPLE 3

4-α-thienyl-3,4-dihydroquinazoline

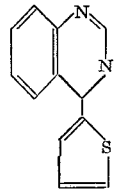

Reflux a mixture of 8.4 parts of freshly distilled thiophene in 100 parts by volume of diethylether and 68 parts by volume of 1.6 N solution of butyl lithium in hexane for 4 hours. Cool the thus-obtained reaction mixture to −30° and add dropwise to the cooled reaction mixture a solution of 13 parts of quinazoline in 100 parts by volume of diethylether within from 5 to 10 minutes. Continue stirring for 1½ hours, letting the temperature of the reaction mixture come slowly up to 0°. Add slowly to the resultant 200 parts by volume of ice cold water, separate the organic phase, extract the aqueous phase twice (500 parts by volume each) with methylene chloride and dry the combined organic phases over sodium sulfate. After evaporation to dryness in vacuo, recrystallize the solid residue (title compound), M.P. 169° to 171°, from ethylacetate.

Replacing the quinazoline with an equivalent of either 7 - methoxyquinazoline, 6,7 - dimethoxyquinazoline, 7-ethoxyquinazoline, 7-bromoquinazoline or 7-ethoxy-6-methoxyquinazoline results in the preparation, in similar manner, of 7-methoxy-4-α-thienyl-3,4-dihydroquinazoline, 6,7-dimethoxy-4-α-thienyl - 3,4 - dihydroquinazoline, 7-ethoxy-4-α-thienyl-3,4-dihydroquinazoline, 7 - bromo-4-α-thienyl-3,4-dihydroquinazoline and 7-ethoxy-6-methoxy-4-α-thienyl-3,4-dihydroquinazoline.

EXAMPLE 4

4-benzyl-3,4-dihydroquinazoline

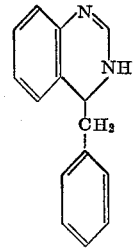

Add dropwise a solution of 9 parts of quinazoline in 80 parts by volume of diethylether to a solution of 12 parts of benzylmagnesium chloride in 100 parts by volume of diethylether within 10 minutes under reflux and continue refluxing for 60 minutes. Decompose the reaction mixture by adding thereto 200 parts by volume of water, separate the organic phase and extract the aqueous phase twice with diethylether. Dry the combined organic phases over sodium sulfate, filter and evaporate the thus-obtained solution to dryness in vacuo. Crystallize the residue (title compound), M.P. 120° to 121°, from diethylether-petroleum ether.

Replacing the quinazoline by an equivalent of either 7-methoxyquinazoline, 6,7-dichloroquinazoline, 7-ethoxyquinazoline, 7-bromoquinazoline or 7-ethoxy-6-methoxyquinazoline results in the preparation, in similar manner, of 4-benzyl-7-methoxy - 3,4 - dihydroquinazoline, 6,7-dichloro-4-benzyl - 3,4 - dihydroquinazoline, 4-benzyl-7-ethoxy-3,4-dihydroquinazoline, 7-bromo-4-benzyl - 3,4 - dihydroquinazoline and 4-benzyl-7-ethoxy-6-methoxy-3,4-dihydroquinazoline, respectively.

EXAMPLE 5

4-phenethyl-3,4-dihydroquinazoline maleate

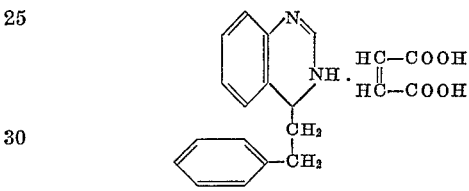

Add dropwise a solution of 10 parts of quinazoline in 60 parts by volume of diethylether to a solution of 11.7 parts of β-phenethylmagnesium chloride in 100 parts by volume of diethylether within 10 minutes under reflux, and continue refluxing for 30 minutes. Work the reaction mixture up as described in Example 4. Dissolve the crude residue thus obtained in 50 parts by volume of ethanol, and add thereto a solution of 6.5 parts of maleic acid in 50 parts by volume of ethanol to precipitate the title compound, M.P. 182° to 185°.

Replacing the quinazoline with an equivalent of either 7-chloroquinazoline, 6-ethoxyquinazoline, 6-bromoquinazoline, 6,7-diethoxyquinazoline, 6-methoxyquinazoline or 6-ethoxy-7-methoxyquinazoline results in the preparation, in similar manner, of 7 - chloro-4-phenethyl-3,4-dihydroquinazoline, 6-ethoxy-4-phenethyl-3,4-dihydroquinazoline, 6-bromo-4-phenethyl - 3,4 - dihydroquinazoline, 6,7-diethoxy-4-phenethyl - 3,4 - dihydroquinazoline, 6-methoxy-4-phenethyl - 3,4 - dihydroquinazoline and 6 - ethoxy-7-methoxy-4-phenethyl-3,4-dihydroquinazoline, respectively.

EXAMPLE 6

4-α-furyl-3,4-dihydroquinazoline

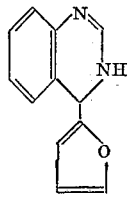

Reflux a mixture of 5.1 parts of furane in 100 parts by volume of diethylether and 48 parts by volume of a 1.6 N solution of butyl lithium in hexane for 3 hours. Cool the thus-obtained reaction mixture to −40°, and add dropwise thereto (under stirring) a solution of 9 parts of quinazoline in 70 parts by volume of diethylether within 10 minutes. Continue stirring for another 2 hours at −20°. Decompose the reaction mixture by adding water and dilute hydrochloric acid thereto. Separate the aqueous layer from the organic phase. Alkalize the thus-obtained aqueous phase with 2 N sodium hydroxide, and extract the alkalized aqueous phase three times with benzene. After drying and evaporating the solvent, purify the crude residue by column chromotography. The title compound, M.P. 123°, crystallizes from ethylacetate.

Replacing the quinazoline with an equivalent of either 7 - methoxyquinazoline, 6 - ethoxyquinazoline, 7 - ethoxyquinazoline, 6,7-diethoxyquinazoline, 7-ethoxy-6-methoxyquinazoline or 6 - ethoxy - 7 - methoxyquinazoline results in the preparation, in similar manner, of 7-methoxy-4-α-furyl-3,4-dihydroquinazoline, 6 - ethoxy - 4 - α - furyl-3,4-dihydroquinazoline, 7 - ethoxy - 4 - α - furyl-3,4-dihydroquinazoline, 6,7 - diethoxy-4-α-furyl-3,4-dihydroquinazoline, 7 - ethoxy-6-methoxy-4-α-furyl-3,4-dihydroquinazoline and 6 - ethoxy - 7 - methoxy-4-α-furyl-3,4-dihydroquinazoline, respectively.

EXAMPLE 7

4-cyclohexyl-5-ethyl-3,4-dihydroquinazoline

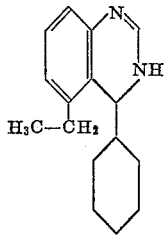

Following the procedure of Example 1, but replacing the quinazoline with an equivalent of 5-ethylquinazoline, results in the preparation of the title compound. In like manner, replacing the cyclohexyl bromide with an equivalent of the corresponding reactant enumerated in Table A and the quinazoline with an equivalent of the corresponding Compound II in Table A results in the preparation of the corresponding Compound I in Table A.

TABLE A

| Halide | Compound II | Compound I |
|---|---|---|
| Benzyl chloride | 8-ethylquinazoline | 4-benzyl-8-ethyl-3,4-dihydroquinazoline. |
| Phenethyl chloride | 5,6-dimethylquinazoline. | 5,6-dimethyl-4-phenethyl-3,4-dihydroquinazoline. |
| Cyclohexyl bromide | 5,8-dimethylquinazoline. | 4-cyclohexyl-5,8-dimethyl-3,4-dihydroquinazoline. |
| Benzyl bromide | 7,8-dimethylquinazoline. | 4-benzyl-7,8-dimethyl-3,4-dihydroquinazoline. |
| Phenethyl bromide | 6,8-dimethylquinazoline. | 6,8-dimethyl-4-phenethyl-3,4-dihydroquinazoline. |
| Cyclopentyl bromide | 5,7-diethylquinazoline. | 4-cyclopentyl-5,7-diethyl-3,4-dihydroquinazoline. |
| Benzyl chloride | 5-methoxyquinazoline. | 4-benzyl-5-methoxy-3,4-dihydroquinazoline. |
| Phenethyl chloride | 8-methoxyquinazoline. | 8-methoxy-4-phenethyl-3,4-dihydroquinazoline. |
| Cycloheptyl bromide | 7,8-dimethoxyquinazoline. | 4-cycloheptyl-7,8-dimethoxy-3,4-dihydroquinazoline. |
| Benzyl chloride | 7,8-methylenedioxyquinazoline. | 4-benzyl-7,8-methylenedioxy-3,4-dihydroquinazoline. |

EXAMPLE 8

5-chloro-4-β-pyridyl-3,4-dihydroquinazoline

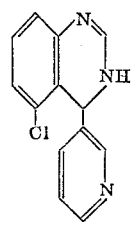

Following the procedure of Example 2, but replacing the 2-bromopyridine with an equivalent of 3-bromopyridine and the quinazoline with an equivalent of 5-chloroquinazoline, results in the preparation of the title compound.

In like manner, replacing said 3-bromopyridine with an equivalent of the Compound IV in Table B and said quinazoline with an equivalent of the Compound II in Table B results in the preparation of the corresponding Compound I in Table B.

EXAMPLE 9

Quinazoline

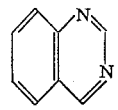

Intimately mix 7 parts of α,α-diformamido-o-nitrotoluene (prepared by heating 2-nitrobenzaldehyde with formamide, initially at from 40° to 50°, in a current of dry hydrogen chloride; maintaining the temperature at about 80° for 1 hour; triturating the product with ice-cold ethanol; and working up) with 20 parts of zinc dust and 80 parts of crushed ice. Add slowly thereto 30 parts by volume of glacial acetic acid (with continuous stirring) over a period of 10 minutes. Permit the mixture to come to room temperature (20°); stir said mixture for 2 hours with frequent additions of small quantities of zinc dust; filter resultant; make the filtrate alkaline with sodium hydroxide; extract the obtained alkaline filtrate with diethylether; and evaporate the diethylether to obtain the title compound.

TABLE B

| Compound IV | Compound II | Compound I |
|---|---|---|
| γ-Pyridyl lithium | 8-chloroquinazoline | 8-chloro-4-γ-pyridyl-3,4-dihydroquinazoline. |
| α-Thienyl lithium | 5-bromoquinazoline | 5-bromo-4-α-thienyl-3,4-dihydroquinazoline. |
| α-Furyl lithium | 8-bromoquinazoline | 8-bromo-4-α-furyl-3,4-dihyrdoquinazoline. |
| α-Pyridyl lithium | 5,8-dichloroquinazoline | 5,8-dichloro-4-α-pyridyl-3,4-dihydroquinazoline. |
| β-Pyridyl lithium | 5-methylquinazoline | 5-methyl-4-β-pydridyl-3,4-dihydroquinazoline. |
| γ-Pyridyl lithium | 8-methylquinazoline | 8-methyl-4-γ-pyridyl-3,4-dihydroquinazoline. |
| α-Thienyl lithium | 5,6-dimethoxyquinazoline. | 5,6-dimethoxy-4-α-thienyl-3,4-dihydroquinazoline. |
| α-Furyl lithium | 6,8-dimethoxyquinazoline. | 6,8-dimethoxy-4-α-furyl-3,4-dihydroquinazoline. |
| α-Pyridyl lithium | 8-ethoxyquinazoline | 8-ethoxy-4-α-pyridyl-3,4-dihydroquinazoline. |
| β-Pyridyl lithium | 5-ethoxy-7-methoxyquinazoline. | 5-ethoxy-7-methoxy-4-β-pyridyl-3,4-dihydroquinazline. |
| γ-Pyridyl lithium | 6,7-methylenedioxyquinazoline. | 6,7-methylenedioxy-4-γ-pyridyl-3,4-dihydroquinazoline. |

The preceding method is published [Sidhu et al., Indian J. Chem., 1 (8), 346 and 347, 1963; Chemical Abstracts, 60, 524 a–d, 1964].

Replacing the 2-nitrobenzaldehyde with an equivalent of each of the starting materials A in Table C results in the preparation, in similar manner, of the corresponding quinazoline B in Table C.

EXAMPLE 10

Granulate a mixture of 125 parts of the title compound of Example 1 and 50 parts of lactose with a sufficient quantity of water and to the resultant add 200 parts of maize starch. Pass the obtained mass through a 16 mesh screen. Then dry the prepared granules in a current of air at a temperature not exceeding 65°. Pass the thus-dried granules through a 16 mesh screen, and mix the screened material with 7.5 parts of magnesium stearate prior to compressing into tablets. There are thus obtained tablets suitable for oral administration.

Replacing the title compound of Example 1 with that of any of Examples 2 to 7 or a pharmaceutically acceptable acid addition salt, e.g. the acid maleate, thereof, also results in the preparation of suitable tablets.

EXAMPLE 11

Ball-mill a mixture of 5.5 parts of the title compound of Example 2, 3 parts of the calcium salt of lignin sulfonic acid and 237 parts by volume of water until the size of substantially all of the particles of 4-α-pyridyl-3,4-dihydroquinazoline maleate is less than 10 microns. Dilute the obtained suspension with a solution containing 3 parts of sodium carboxymethylcellulose and 0.9 part of the butyl ester of p-hydroxybenzoic acid in 300 parts by volume of water. An aqueous suspension suitable for oral administration is thus obtained.

TABLE C

| A | B |
|---|---|
| 4-chloro-2-nitrobenzaldehyde | 7-chloroquinazoline. |
| 5-chloro-2-nitrobenzaldehyde | 6-chloroquinazoline. |
| 4,5-dichloro-2-nitrobenzaldehyde | 6,7-dichloroquinazoline. |
| 4-bromo-2-nitrobenzaldehyde | 7-bromoquinazoline. |
| 5-bromo-2-nitrobenzaldehyde | 6-bromoquinazoline. |
| 4-methoxy-2-nitrobenzaldehyde | 7-methoxyquinazoline. |
| 5-methoxy-2-nitrobenzaldehyde | 6-methoxyquinazoline. |
| 4,5-dimethoxy-2-nitrobenzaldehyde | 6,7-dimethoxyquinazoline. |
| 4-ethoxy-2-nitrobenzaldehyde | 7-ethoxyquinazoline. |
| 5-ethoxy-2-nitrobenzaldehyde | 6-ethoxyquinazoline. |
| 4,5-diethoxy-2-nitrobenzaldehyde | 6,7-diethoxyquinazoline. |
| 5-ethoxy-4-methoxy-2-nitrobenzaldehyde. | 6-ethoxy-7-methoxyquinazoline. |
| 4-ethoxy-5-methoxy-2-nitrobenzaldehyde. | 7-ethoxy-6-methoxyquinazoline. |
| 3-chloro-2-nitrobenzaldehyde | 8-chloroquinazoline. |
| 6-bromo-2-nitrobenzaldehyde | 5-bromoquinazoline. |
| 3-bromo-2-nitrobenzaldehyde | 8-bromoquinazoline. |
| 3,6-dichloro-2-nitrobenzaldehyde | 5,8-dichloroquinazoline. |
| 6-methyl-2-nitrobenzaldehyde | 5-methylquinazoline. |
| 3-methyl-2-nitrobenzaldehyde | 8-methylquinazoline. |
| 5,6-dimethoxy-2-nitrobenzaldehyde | 5,6-dimethoxyquinazoline. |
| 3,5-dimethoxy-2-nitrobenzaldehyde | 6,8-dimethoxyquinazoline. |
| 3-ethoxy-2-nitrobenzaldehyde | 8-ethoxyquinazoline. |
| 6-ethoxy-4-methoxy-2-nitrobenzaldehyde. | 5-ethoxy-7-methoxyquinazoline. |
| 4,5-methylenedioxy-2-nitrobenzaldehyde. | 6,7-methylenedioxyquinazoline. |
| 3-ethyl-2-nitrobenzaldehyde | 8-ethylquinazoline. |
| 5,6-dimethyl-2-nitrobenzaldehyde | 5,6-dimethylquinazoline. |
| 3,6-dimethyl-2-nitrobenzaldehyde | 5,8-dimethylquinazoline. |
| 3,4-dimethyl-2-nitrobenzaldehyde | 7,8-dimethylquinazoline. |
| 3,5-dimethyl-2-nitrobenzaldehyde | 6,8-dimethylquinazoline. |
| 4,6-diethyl-2-nitrobenzaldehyde | 5,7-diethylquinazoline. |
| 6-methoxy-2-nitrobenzaldehyde | 5-methoxyquinazoline. |
| 3-methoxy-2-nitrobenzaldehyde | 8-methoxyquinazoline. |
| 3,4-dimethoxy-2-nitrobenzaldehyde | 7,8-dimethoxyquinazoline. |
| 3,4-methylenedioxy-2-nitrobenzaldehyde. | 7,8-methylenedioxyquinazoline. |

EXAMPLE 12

Mix a mixture of 30 parts of the title compound of Example 3, 202 parts of maize starch and 35 parts of alginic acid with a sufficient quantity of 10% aqueous paste of maize starch, and granulate the resultant. Dry the granules in a current of warm air before passing them through a 16 mesh screen. Mix the screened granules with 5 parts of magnesium stearate. Compress the obtained admixture into tablet form. There are thus obtained tablets suitable for oral administration.

EXAMPLE 13

Granulate a mixture of 10 parts of the title compound of Example 4, 37 parts of maize starch and 10 parts of gum acacia with a sufficient quantity of water. Pass the resulting mass through a 12 mesh screen, and dry the obtained granules in a current of warm air. Pass the dried granules through a 16 mesh screen before mixing them with 3 parts of magnesium stearate. Then compress the resulting mixture into tablet form.

EXAMPLE 14

Ball-mill for several hours a mixture of 0.4 part of the title compound of Example 5, 40 parts of sucrose, 0.5 part of a cetyl alcohol polyethylene oxide condensate, 1 part of polyvinyl pyrrolidone, 0.25 part of methyl p-hydroxybenzoate and 100 parts by volume of water. Incorporate in the resultant suitable coloring and flavoring agents to obtain an aqueous suspension suitable for oral administration.

EXAMPLE 15

Mix 0.5 part of the title compound of Example 6 in a finely divided form with 12 parts of powdered gum acacia, 0.8 part of powdered tragacanth and 0.4 part of elixir of saccharin. Mix the resultant with 50 parts by volume of arachis oil. Mix the obtained oily suspension with 50 parts of water to obtain an emulsion suitable for oral administration.

EXAMPLE 16

Mix 20 parts of the title compound of Example 7 thoroughly with 10 parts of Tween 80 and 416 parts by volume of propylene glycol. Add to the obtained mixture (with stirring) a solution consisting of 15 parts of tartaric acid dissolved in 200 parts by volume of water for injection. Adjust the resulting solution to pH 3.0 with 0.1 N (aq) sodium hydroxide. Bring the obtained solution to 1000 parts by volume with water for injection, stir thoroughly and filter through a millipore filter. Fill 1 milliliter ampul with this solution under an atmosphere of carbon dioxide, seal the ampuls, and heat sterilize them at 121° for 15 minutes.

The invention is readily understood from the foregoing description.

What is claimed is:

1. A compound selected from the group consisting of (a) a 3,4-dihydroquinazoline of the formula

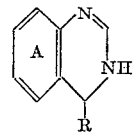

wherein

R is a member selected from the group consisting of cycloalkyl having from 4 to 6 ring carbon atoms, pyridyl, furyl, thienyl and phenyl(lower)alkyl; and Ring A is either unsubstituted or substituted in from one to two positions, any substituent being selected from the group consisting of halogen, lower alkyl, lower alkoxy and methylenedioxy;

and (b) a pharmaceutically acceptable acid addition salt thereof.

2. A compound according to claim 1 wherein ring A is either unsubstituted or substituted in the 6- and/or the 7-position, any substituent being selected from the group consisting of chlorine, bromine, methyl, ethyl, methoxy, ethoxy and methylenedioxy.

3. A compound according to claim 2 wherein R is cyclohexyl.

4. The compound according to claim 3 which is 4-cyclohexyl-3,4-dihydroquinazoline.

5. A compound according to claim 2 wherein R is pyridyl.

6. A compound according to claim 2 wherein R is α-pyridyl.

7. The compound according to claim 6 which is 4-α-pyridyl-3,4-dihydroquinazoline.

8. The compound according to claim 6 which is 4-α-pyridyl-3,4-dihydroquinazoline maleate.

9. A compound according to claim 2 wherein R is α-thienyl.

10. The compound according to claim 9 which is 4-α-thienyl-3,4-dihydroquinazoline.

11. A compound according to claim 2 wherein R is phenyl(lower)alkyl.

12. The compound according to claim 11 wherein R is benzyl.

13. The compound according to claim 12 which is 4-benzyl-3,4-dihydroquinazoline.

14. A compound according to claim 11 wherein R is phenethyl.

15. The compound according to claim 14 which is 4-phenethyl-3,4-dihydroquinazoline.

16. The compound according to claim 14 which is 4-phenethyl-3,4-dihydroquinazoline maleate.

17. A compound according to claim 2 wherein R is α-furyl.

18. The compound according to claim 17 which is 4-α-furyl-3,4-dihydroquinazoline.

References Cited

UNITED STATES PATENTS 3,127,401  3/1964  Lawes et al. _____ 260—251

ALEX MAZEL, Primary Examiner

R. V. RUSH, Assistant Examiner

U.S. Cl. X.R.

260—256.4; 424—251